Sept. 11, 1928.
H. H. BLACHE
1,683,756
STUFFING BOX FOR PROPELLER SHAFTS
Filed May 18, 1926
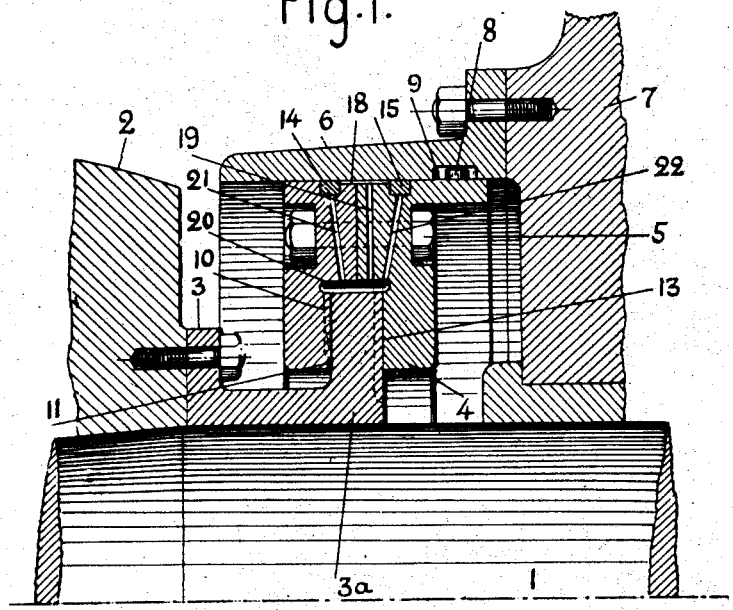
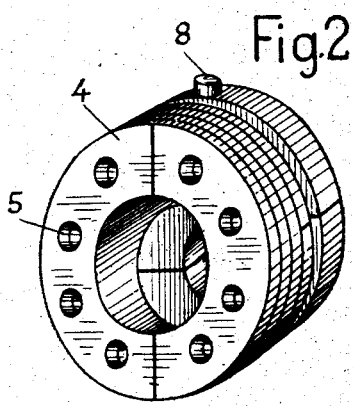
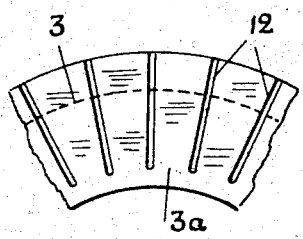
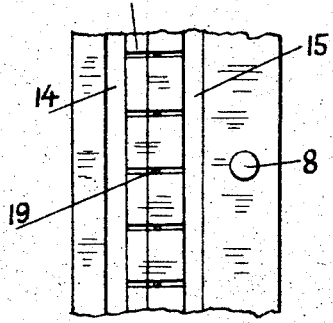
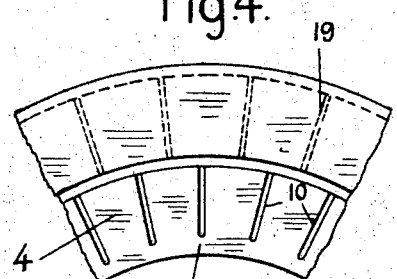
Inventor
H. H. Blache
by
Langner Parry Cardwalager, Attys Patented Sept. 11, 1928.

1,683,756

UNITED STATES PATENT OFFICE.

HANS HENRIK BLACHE, OF HELLERUP, NEAR COPENHAGEN, DENMARK.

STUFFING BOX FOR PROPELLER SHAFTS.

Application filed May 18, 1926. Serial No. 109,938, and in Denmark June 10, 1925.

This invention relates to a stuffing box for propeller shafts which allows the propeller shaft and the shafting to expand freely during variations in temperature.

The drawing shows an example of a stuffing box constructed in accordance with the invention, viz:

Fig. 1 is a longitudinal section through one half of the stuffing box,

Fig. 2 is a perspective view of the casing of the stuffing box, movable in axial direction, Fig. 3 is part of the face of a flange fastened on the propeller-boss and engaging the casing of the stuffing box by means of a groove therein.

Fig. 4 is part of the rear face of the said groove, and

Fig. 5 is part of the circumference of the said casing, as seen when unfolded.

The Figs. 3 to 5 have been drawn to a larger scale than the Figs. 1 and 2.

In Fig. 1 the reference character 1 indicates the propeller shaft, 2 the propeller-boss, 3 a flange bolted on the boss and carrying a flange 3ª which projects into and engages the annular groove 13 in the cylindrical casing 4. The outer surface of the casing 4 is turned exactly cylindrical and is easily movable lengthwise in the inner cylindrical surface of a casing 6 which is made up in two halves and is mounted on the stern 7 of the ship. On the outer surface of the casing 4 a knob 8 or a like projection is mounted, which projects into a lengthwise cut groove 9 in the inner surface of the casing 6, in such a manner that the casing 4 may move longitudinally in relation to the shaft inside the casing 6, but cannot turn round inside this casing. The result is that the propeller shaft and the shafting are allowed to expand freely when this is caused by variations in temperature.

The casing 4 may, as shown in Fig. 2, consist of two rings, each of which again consists of two half rings. The joints between the halves of the rings are not opposite each other in the two rings; in the figure they are displaced 90°. The parts are kept together by means of bolts 5 (Figs. 1 and 2) the heads of which are countersunk in the end surfaces of the casing.

The faces of the flange 3ª, besides providing a seal between the rotating flange 3 and the casing 4, at the same time must serve in transferring the force which causes the casing 4 to be moved within the casing 6, and accordingly these faces have to be kept clear of the sea-water. It is known to keep the stern tube and the inner space of the stuffing box filled with oil, and the present invention now has for its objects to divide the sealing surfaces of the flange into bearing surfaces and sealing surfaces.

For this purpose the front face of the flange 3ª, as shown in Fig. 3, is provided with radially cut lubricating grooves 12, through which the lubricating oil is carried from the stern tube on to this surface and into the bottom 20 of the groove 13 in the casing 4. The oil will pass in subjected to a certain pressure because the lubricating grooves 12, when the flange rotates, will act upon the oil in quite the same way as a centrifugal pump. The rear face of the flange is smooth and without grooves and accordingly it can exert no influence at all, which also would cause the sea-water to be pumped into the stuffing box. In the surface of the casing 4 opposite to the rear face of the flange 3ª, however, radial lubricating grooves 10 (see Figs. 1 and 4) have been cut, in such a manner that they only continue up to a certain distance from the inner edge of the casing 4 and thus leave an edge 11 which forms the sealing surface. In this way that part of the rear face of the flange which is opposite to the surface of the casing 4 in which the lubricating grooves 10 are situated, presents a well-oiled bearing surface, capable of transferring the force instrumental in moving the house or casing 4, while the narrow inner edge 11, in which no grooves are cut, forms a sealing surface that still will be oiled thoroughly, because the lubricating grooves pass right up to this edge.

The seal between the outer cylindrical surface of the casing 4 and the inner cylindrical surface of the casing 6, as also the taking up of the pressure between these two surfaces, is effected by means of one or more spring piston rings inlaid in the casing 4, for instance as shown in Figs. 1 and 5 two piston rings 14 and 15, being situated respectively near the front and rear edges of the casing. That part of the cylindrical surface of the casing which lies between the piston rings and which serves in taking up the pressure between the casing 4 and the casing 6 is provided with lubricating grooves 18 cut in axial direction, and these grooves are connected to the bottom 20 (Fig. 1) of the groove 13 by means of drilled holes 19. The space 20 is further connected to the annular grooves for the piston rings 14 and 15 as cut in the casing 4 by means of a series of drilled holes 21 and 22. As the oil in the space 20 is subjected to a raised pressure on account of the pump action caused by the rotation of the flange, the whole area between the two piston rings acting as a bearing surface will be lubricated by means of the holes 19 and the lubricating grooves 18, while the piston rings 14 and 15 will be kept swimming in oil by the flow through the holes 21 and 22 and thus be kept protected against the sea-water.

I claim:

1. A stuffing box constructed for propeller shafts including a flange in fixed relation to the propeller shaft, a casing having an annular grove into which said flange rotatably fits, a hollow member adapted to be secured to the stern of a ship, said casing fitting within said hollow member as a piston, interengaging means on said casing and hollow member limiting the relative movement of said casing to said member to slight movement axially of the propeller shaft so that said casing may move with said flange responsively to length variation of said propeller shaft due to temperature changes, spring piston rings inlaid in the circumference of the casing near its ends, for maintaining a sealed joint between said casing and said hollow member, said spring piston rings being lubricated from the bottom of the annular groove of the casing, through interconnecting drilled holes, said casing being pressed continuously into sealing contact with the rear face of said flange under fluid pressure of the water in which the stern of the ship is immersed, and said casing and the rear face of said flange being formed peripherally of said casing with annular coacting, plane, continuous sealing surfaces, constituting a water-tight joint.

2. A stuffing box as claimed in claim 1 in which the portion of the casing lying between the piston rings is provided with lubricated grooves, these grooves communicating with the bottom of the annular groove in the casing by means of drilled holes.

3. A stuffing box constructed for propeller shafts including a flange in fixed relation to the propeller shaft, a casing having an annular groove into which said flange rotatably fits, a hollow member adapted to be secured to the stern of a ship, said casing fitting within said hollow member as a piston, interengaging means on said casing and hollow member limiting the relative movement of said casing to said member to slight movement axially of the propeller shaft so that said casing may move with said flange responsively to length variation of said propeller shaft due to temperature changes, said casing being pressed continuously into sealing contact with the rear face of said flange under fluid pressure of the water in which the stern of the ship is immersed, said casing and the rear face of said flange being formed peripherally of said casing with annular coacting, plane, continuous sealing surfaces, constituting a water-tight joint, the flange having a smooth rear face and being provided on its front side with radially arranged groves, and the annular groove in the casing opposite the smooth face of the flange being provided with radially arranged grooves extending from the bottom of the annular groove and terminating short of the edge of the annular groove.

In testimony whereof I affix my signature.

HANS HENRIK BLACHE.